United States Patent
Dikvall

(10) Patent No.: US 9,344,721 B2
(45) Date of Patent: May 17, 2016

(54) BEST QUALITY GIVEN A MAXIMUM BIT RATE

(75) Inventor: Henrik Dikvall, Vaxholm (SE)

(73) Assignee: SAAB AB, Linkoeping (SE)

( * ) Notice: Subject to any disclaimer, the term of this patent is extended or adjusted under 35 U.S.C. 154(b) by 332 days.

(21) Appl. No.: 14/125,458

(22) PCT Filed: Jun. 23, 2011

(86) PCT No.: PCT/SE2011/050842
§ 371 (c)(1),
(2), (4) Date: Jan. 16, 2014

(87) PCT Pub. No.: WO2012/177202
PCT Pub. Date: Dec. 27, 2012

(65) Prior Publication Data
US 2014/0126628 A1    May 8, 2014

(51) Int. Cl.
H04N 7/12        (2006.01)
H04N 19/152    (2014.01)
H04N 19/15      (2014.01)
H04N 19/103    (2014.01)
H04N 19/132    (2014.01)
H04N 19/187    (2014.01)
H04N 19/36      (2014.01)

(52) U.S. Cl.
CPC ....... *H04N 19/00193* (2013.01); *H04N 19/103* (2014.11); *H04N 19/132* (2014.11); *H04N 19/15* (2014.11); *H04N 19/152* (2014.11); *H04N 19/187* (2014.11); *H04N 19/36* (2014.11)

(58) Field of Classification Search
IPC .................................................. H04N 19/146
See application file for complete search history.

(56) References Cited

U.S. PATENT DOCUMENTS 7,496,142 B2    2/2009    Hui et al.
7,630,570 B1    12/2009    Haskell et al.
(Continued)

FOREIGN PATENT DOCUMENTS
EP    1750266 A1    2/2007

OTHER PUBLICATIONS

International Preliminary Examing Authority (IPEA), *CORRECTED* International Preliminary Report on Patentability (IPRP), including Applicant's response to ISA's Apr. 20, 2012 Written Opinion, for International Application No. PCT/SE2011/050842, completed Dec. 10, 2013, 19 pages, Swedish Patent and Registration Office, Sweden.
(Continued)

*Primary Examiner* — Tracy Li
(74) *Attorney, Agent, or Firm* — Alston & Bird LLP

(57) ABSTRACT

The present invention relates to flow control of a digital data stream that is to be transmitted with limited bit rate. The present invention provides a mix between CQ and CB. This in order to, in real time, ensure best possible quality of a data stream given a maximum available band with. This is useful both when saving a data stream to a data storage with a limited size and when playing the data stream in real time. In particular the invention relates to a method for flow control of a digital data stream that is to be sent with a limited transmission bit rate R. The method comprises encoding each data frame of a digital data stream into an encoded data frame comprising n quality layers and thereafter balancing the output of the encoder in order to achieve a constant bit rate on the output. The invention also relates to a corresponding data recorder and computer program.

23 Claims, 8 Drawing Sheets

(56) References Cited

U.S. PATENT DOCUMENTS

| | | | | |
|---|---|---|---|---|
| 2003/0058931 | A1* | 3/2003 | Zhang | H04N 21/234327 375/240.01 |
| 2006/0050970 | A1 | 3/2006 | Gunatilake | |
| 2007/0206873 | A1 | 9/2007 | Schwenke et al. | |
| 2008/0301742 | A1* | 12/2008 | Hannuksela | H04N 7/17327 725/105 |
| 2012/0082214 | A1* | 4/2012 | Horowitz | H04N 19/172 375/240.03 |

OTHER PUBLICATIONS

European Patent Office, Extended European Search Report for Application No. 11868339.0, Oct. 1, 2014, 7 pages, Germany.

International Searching Authority (ISA), International Search Report and Written Opinion for International Application No. PCT/SE2011/050842, mailed Apr. 20, 2012, 14 pages, Swedish Patent and Registration Office, Sweden.

International Preliminary Examining Authority (IPEA), International Preliminary Report on Patentability (IPRP), including Applicant's response to ISA's Apr. 20, 2012 Written Opinion, for International Application No. PCT/SE2011/050842, completed Oct. 30, 2013, 19 pages, Swedish Patent and Registration Office, Sweden. (IPEA to issue a corrected IPRP as p. 19 is missing from p. 2, Box No. 1, Basis of Report, at 2, the description: pages.).

International Preliminary Examining Authority, Second Written Opinion of the IPEA for International Application No. PCT/SE2011/050842, mailed Sep. 5, 2013, 7 pages, Swedish Patent and Registration Office, Sweden.

SAAB AB, Applicant's Response to IPEA's Sep. 5, 2013, Written Opinion for International Application No. PCT/SE2011/050842, dated Oct. 4, 2013, 6 pages, Zacco Sweden AB, Sweden.

Chou, Chun-Hsien, et al, "Two-Stage Buffer Control for Constant Quality Transmission of Motion JPEG200 Video Streams," Proceedings of the 15$^{th}$ Asia-Pacific Conference on Communications (APCC 2009), Oct. 8-10, 2009, pp. 261-264, IEEE, USA.

Dagher, J.C., Bilgin, A, and Marcellin, M.W., "Resource-Constrained Rate Control for Motion JPEG2000," IEEE Transactions on Image Processing, Dec. 2003, pp. 1522-1529, vol. 12, No. 12, IEEE, USA.

* cited by examiner

BEST QUALITY GIVEN A MAXIMUM BIT RATE

CROSS REFERENCE TO RELATED APPLICATIONS

This application is a national stage application, filed under 35 U.S.C. §371, of International Application No. PCT/SE2011/050842, filed Jun. 23, 2011, the contents of which are hereby incorporated by reference in its entirety.

BACKGROUND

1. Related Field

The present invention relates to a method for flow control of a digital data stream that is to be transmitted with limited bit rate. The transmission link may e.g. be a radio link or an interface to a data storage. The invention can typically be applied in any product where data compression is used to reduce the amount of data from a source e.g. a video source. The invention also relates to a corresponding apparatus and computer program.

2. Description of Related Art

Two very common techniques in terms of compression ratio control of lossy video compression algorithms are Constant Quality (CQ) and Constant Bit rate (CB). Quality, in this context, refers to how well the decompressed data reproduces the original data. The quality of an image may e.g. be the resolution of the decompressed image.

When using CQ, a least acceptable quality level is set and the bit rate of the compressed data stream is allowed to fluctuate over time in order to always meet this quality level regardless of the current image content.

When using Constant Bit rate (CB), a maximum allowed bit rate is set and the quality is allowed to fluctuate over time in order to ensure that the maximum allowed bit rate is never exceeded, regardless of the current image content.

Most compression algorithms can achieve very high compression ratio and yet maintain the image quality, when applied on a low complexity image. However, when applied on a high complexity image, the result is the opposite. The complexity of the incoming images is rarely known beforehand. This implies that the compression ratio of the compression algorithm over time is unknown.

It is often desired to have a constant quality (CQ). However, in recording or network applications, the use of CQ often implies a risk of temporary exceeding the bit rate of the downstream destinations. Using CQ also means that it is impossible to forsee the size of the storage media needed to store a given segment in time. To avoid running into problems related to the abovementioned issues, one needs to design for "worst case". This however means that one is likely to end up with a storage media that is far bigger than it probably needs to be for most use cases, which in turn drives complexity and thereby cost of the product.

In many applications CB is therefore commonly used instead of CQ. Using CB implies that one is able to design the bit rates of all involved interfaces the data is supposed to pass though from source to destination, for a known maximum allowed bit rate. Using CB also means that one is able to guarantee that a required segment of time will fit on a storage media of a specified size. However, the use of CB also has its drawbacks in terms of fluctuating quality in certain applications. Especially, when using CB mode with a video compression algorithm only utilzing intra-frame compression i.e. frame by frame compression, the user is likely to experience these drawbacks.

Hence, selecting among the existing methods often implies a compromise between risk of bad quality and the cost of higher bit rate channels and larger memories. Therefore, finding a way to provide optimized quality given a maximum bit rate would be most welcome.

BRIEF SUMMARY

It is an object of the present invention to offer a mix between CQ and CB. This in order to, in real time, ensure best possible quality of a data stream given a maximum available bandwith. This is useful both when saving a data stream to a data storage with a limited size and when playing the data stream in real time.

In a real time video compression system, we cannot go back a recompress a frame with a different target quality, afterwards. Each frame passes the video compressor only once. However, with a compression scheme using quality layers, we are able to select how many quality layers we want to use afterwards.

The invention is based on the idea to set up the JPEG2000 algorithm in CQ mode, with a ambitious target quality and to balance the output bit rate over time in order to minimize overflow, by storing a limited number of bits per frame. A temporary overflow may be handled, by once in a while omitting individual quality layers.

In particular the invention relates to a method for flow control of a first digital data stream that is to be sent with a limited transmission bit rate R, comprising the following steps:
  setting up an encoder in constant quality mode, resulting in a variable bit rate,
  encoding, with the encoder, each data frame of the first digital data stream into an encoded frame comprising n quality layers,
  for each encoded frame storing as many of the n quality layers as possible in an output buffer utilising a defined maximum frame size for each encoded frame,
  accumulate the remaining free space of the output buffer for coming data frames and
  if all quality layers could not be stored in the output buffer under the defined maximum frame size, then throw away the remaining quality layers.

According to one aspect of the invention the defined maximum frame size for each encoded frame, is a target frame size defined by the transmission bit rate R, plus free space accumulated from previous frame or frames.

According to one aspect of the invention the defined maximum frame size for each encoded frame is the free space available in said output buffer.

According to another aspect of the invention the target quality results in a variable bit rate, which varies below and above the transmission bit rate R.

According to another aspect of the invention the target quality is visually or mathematically lossless.

According to another aspect of the invention the length of the output buffer is 5-100 data frames.

According to another aspect of the invention the encoder is a JPEG2000 encoder.

According to another aspect of the invention the first digital data stream is a video stream.

According to another aspect of the invention the first digital data stream is an audio stream.

According to another aspect of the invention the transmission bit rate R varies over time and wherein the method further comprises the step of:

continuously changing the target quality of the encoder based on the transmission bit rate R.

According to another aspect of the invention the output buffer is also utilised by a second digital data stream.

The invention also relates to an apparatus for controlling the flow of a first digital data stream that is to be transmitted with a limited transmission bit rate R comprising:
   an encoder adapted to encode each data frame in the first digital data stream into an encoded frame, the encoded frame comprising a first number of quality layers, representing successive quality refinements of the data frame,
   a output buffer with a throughout defined by the limited bit rate R,
wherein the apparatus also comprises:
   a controller adapted to:
   i. set up the encoder in constant quality mode resulting in a variable bit rate,
   ii. for each encoded frame store as many of the n quality layers as possible in the output buffer; utilising a defined maximum frame size for each encoded frame,
   iii. accumulate the remaining free space of the output buffer for coming data frames and
   iv. if all quality layers could not be stored in the output buffer, then throw away the remaining quality layers.

According to another aspect of the invention the defined maximum frame size for each encoded frame, is a target frame size defined by the transmission bit rate R, plus free space accumulated from previous frame or frames.

According to another aspect of the invention the defined maximum frame size for each encoded frame is the free space available in said output buffer.

According to another aspect of the invention the target quality results in a variable bit rate which varies below and above the transmission bit rate R.

According to another aspect of the invention the target quality is visually or mathematically lossless.

According to another aspect of the invention the length of the output buffer is 5-100 data frames.

According to another aspect of the invention the encoder is a JPEG2000 encoder.

According to another aspect of the invention the first digital data stream is a video stream.

According to another aspect of the invention the first digital data stream is an audio stream.

According to another aspect of the invention transmission bit rate R varies over time and wherein the buffer controller is further adapted to:
   continuously adapting the target quality based on the transmission bit rate R.

According to another aspect of the invention the output buffer is also utilised by a second digital data stream.

The invention also relates to a computer to perform the method described above.

The present invention provides for the advantages of constant quality, without having to live with its disadvantages.

One effect of this invention is that available bit rate will be utilised more effectively due to the accumulative bit rate approach.

Another effect of this invention is that the risk of temporary exceeding the bit rate is decreased due to the accumulative bit rate approach. Hence, a higher constant quality (CQ) or a lower maximum bit rate can be used.

Another effect of this invention is that, despite using CQ, it is possible to forsee the size of the storage media needed to store a given segment in time. This in turn reduces complexity and thereby also cost of the product.

A further effect of one aspect of the invention is that it may be applied to several data streams sharing a maximum bit rate. The defined maximum frame size may then also include free space accumulated from previous frame or frames in a second digital data stream. Thereby, the effect of an accumulative bit rate approach may be even bigger.

A further effect of one aspect of the invention, is that the target value of the constant quality encoding may be adjusted over time, in order to handle fluctuations in the channel bit rate e.g. due to transmission channel bit rate varying over time. Thereby, a maximum quality will be achieved even if the given maximum bandwith varies.

BRIEF DESCRIPTION OF THE FIGURES

Further objects and features, of the present invention will appear from the following detailed description of aspects of the invention, wherein the aspects will be described in more detail with reference to the accompanying drawings, in which.

It should be added that the following description of the aspects is for illustrative purposes only and should not be interpreted as limiting the invention exclusively to these aspects.

DETAILED DESCRIPTION OF VARIOUS EMBODIMENTS

The illustrations of present invention relate, in general, to the field of video compression. However, the invention could also be implemented in any device where compression is used to reduce the amount of data that is to be transmitted on a link with limited bit rate. The link could be a radio transmission link as well as an internal interface to a data storage.

Aspects of the present invention will be described more fully hereinafter with reference to the accompanying drawings, in which different aspects of the invention are shown. This invention may, however, be embodied in many different forms and should not be construed as limited to the aspects set forth herein. Rather, these aspects are provided so that this disclosure will be thorough and complete, and will fully convey the scope of the invention to those skilled in the art. Like reference signs refer to like elements throughout.

The method for flow control is based on the concept of a data compression scheme using quality layers. One example of such a compression scheme is JPEG2000. With a compression scheme using quality layers it is possible to encode the data into a fixed number of quality layers and then select how many quality layers to use when decoding the data. For better understanding of the invention, this concept will now be described in more detail.

Figure 1A:
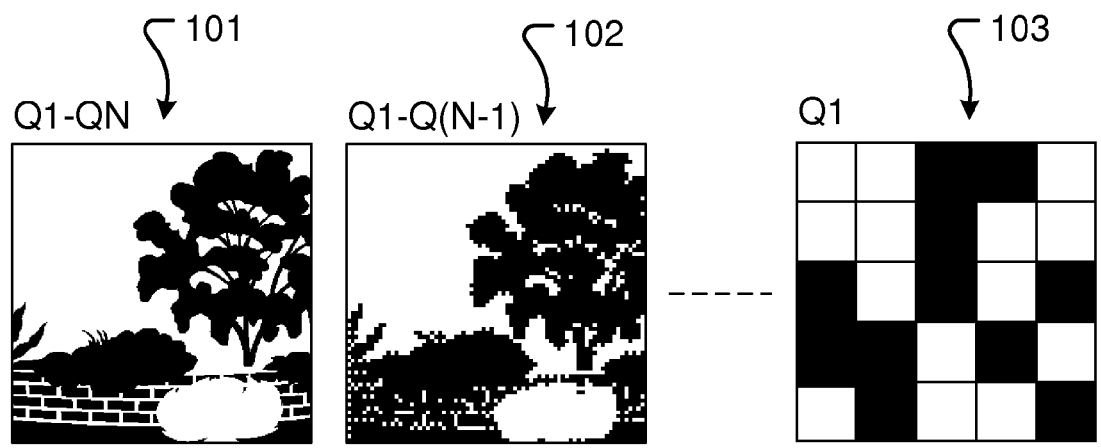
FIG. 1a illustrates the principle of image compression using quality layers according to prior art.

FIG. 1a illustrates the result when decoding an image, using different numbers of quality layers. When a frame is encoded using all quality layers, in this case n quality layers, the resolution of the decoded frame will be visually lossless 101. The resolution may be visually lossless or mathematically lossless. Visually lossless implies that a normal eye cannot see any compression artefacts in the image. Mathematically lossless implies identical on a bit basis.

When using a layered compression scheme, a frame may also be decoded using a reduced number of bits i.e. not all quality layers are used. If the quality layer representing the highest resolution of the frame is omitted the data will be encoded using n−1 quality layers. The result is an image with less resolution 102. The refinement will decrease and the distortion will increase progressively depending on the number of layers "thrown away". If only one layer is used the result is an image with very low resolution 103.

As mentioned before, a common techniques in terms of compression ratio control of lossy video compression algorithms is Constant Quality (CQ). A JPEG2000 compressor may be configured in CQ mode. When using JPEG2000 a fixed number of quality layers is specified, wherein each quality layer corresponds to a constant quality.

If using quality layers in CQ mode, the number bits in each quality layers will depend on the complexity of the image. If the image is e.g. a completely white image, the number of bits required is very low. In principle all information may then be contained in the lowest quality layer (Q1), while the upper layers will comprise a very limited number of bits. However, a complex image may require a large number of bits in each quality layer.

Figure 1B:
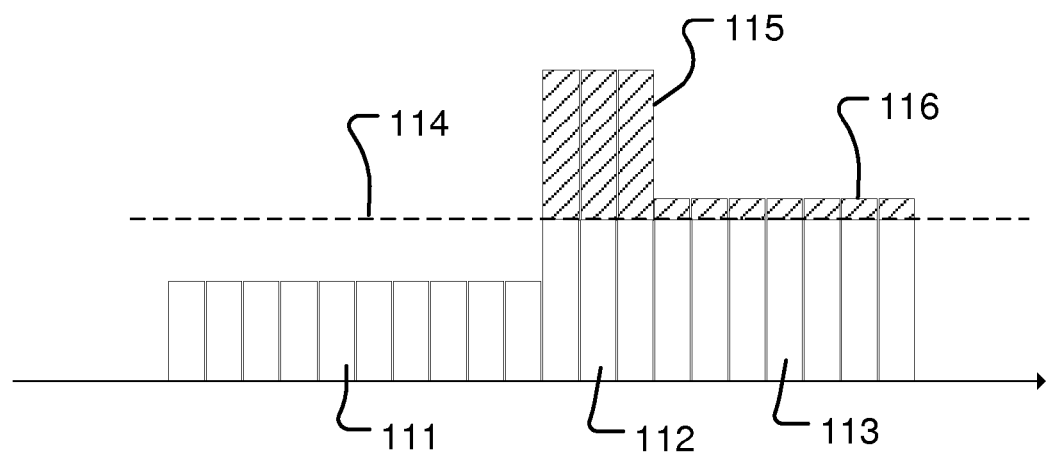
FIG. 1b illustrates the resulting bit rate over time when using constant quality (CQ) with a fixed number of quality layers and a maximum allowed bit rate according to prior art.

FIG. 1b illustrates the bit rate over time when using Constant Quality (CQ) with a fixed number of quality layers and a maximum allowed bit rate, according to prior art. Each pile represents one encoded frame.

In FIG. 1b the horizontal axis represents time and the vertical axis represents the number of bits. This example comprises a twenty-fictive-frames long video sequence. In the example frames #1-#10 111 contain low complexity images, frames #11-#13 112 contain complex images, and finally frame #14-#20 113 contain medium complexity images. The defined maximum frame size for each encoded frame, under the defined maximum bit rate is illustrated by the line 114. In this example, the defined maximum frame size is the bit rate divided by the frame-rate, i.e. the number of bits transmitted per time unit divided by the number of frames transmitted per time unit. Hence, because the output bit-rate is limited, only a limited number of bits per frame encoded is allowed and remaining layers 115 will be omitted.

What will happen is that frame #1-#10 111 will be easy to compress and a visually lossless quality is achieved, even though only 60% of the target rate is used. Frames #11-#13 112 on the other hand will hit the roof on the maximum allowed bit rate 114 and will at that rate suffer from severe compression artifacts, when the upper layers 115 are omitted. Frames #14-#20 113 will also hit the roof on the target rate 114, but will offer acceptable quality, despite the loss of one layer 116.

Hence, over time all bit rate was not utilised, and still frames #11-#13 112 were transmitted with poor quality.

Figure 2:
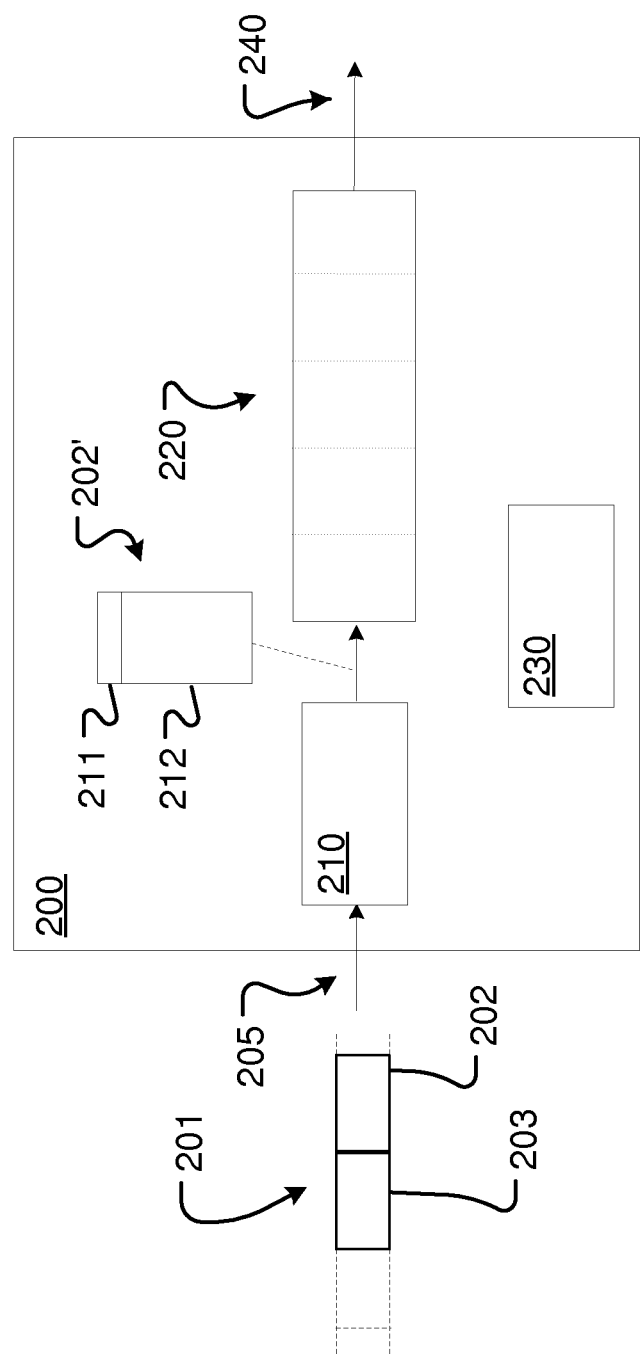
FIG. 2 illustrates an apparatus for controlling the flow of a digital data stream, such as a video or audio stream that is to be transmitted with limited bit rate.

FIG. 2 illustrates an apparatus 200 for controlling the flow of a digital data stream 201, such as a video or audio stream that is to be transmitted with limited bit rate R.

The apparatus 200 comprises an input 205, an encoder 210, an output buffer 220, a controller 230 and an output 240.

The input 205 is adapted to receive digital data stream 201 comprising a number of data frames 202, 203.

The encoder 210 is adapted to encode a data frame 202 into an encoded frame 202'. A data frame 202 refers to a fixed sized data block within the original digital data stream. A data frame 202 in a video stream is typically an image.

An encoded frame 202' is a compressed data frame 202, i.e. the data frame after passing through the encoder 210. An encoded frame 202' typically comprises a header 211 and a number of quality layers 212. As described before, the number bits in each quality layers will depend on the complexity of the image. Hence, the number of bits in the encoded frames vary dependent on the complexity of the images, see FIG. 1b.

The output buffer 220 is a data storage e.g. a memory, where the encoded frames are stored before transmission. Output buffers are commonly used and will therefore not be described in detail. The length of the output buffer 220 may vary, dependant on how long delay is accepted. A long output buffer 220 may generate a long delay on the output 240 in relation to the input 205. However, a long output buffer 220 will facilitate better quality.

The controller 230 is adapted to control the apparatus 200 when compressing a digital data stream 201 that is to be transmitted with a limited transmission bit rate R.

When data has passed through the output buffer 220, it will be provided on the output 240. The output 240 bit rate is typically equal to the limited bit rate R of the transmission channel. How this is achieved will be described below.

Figure 3:
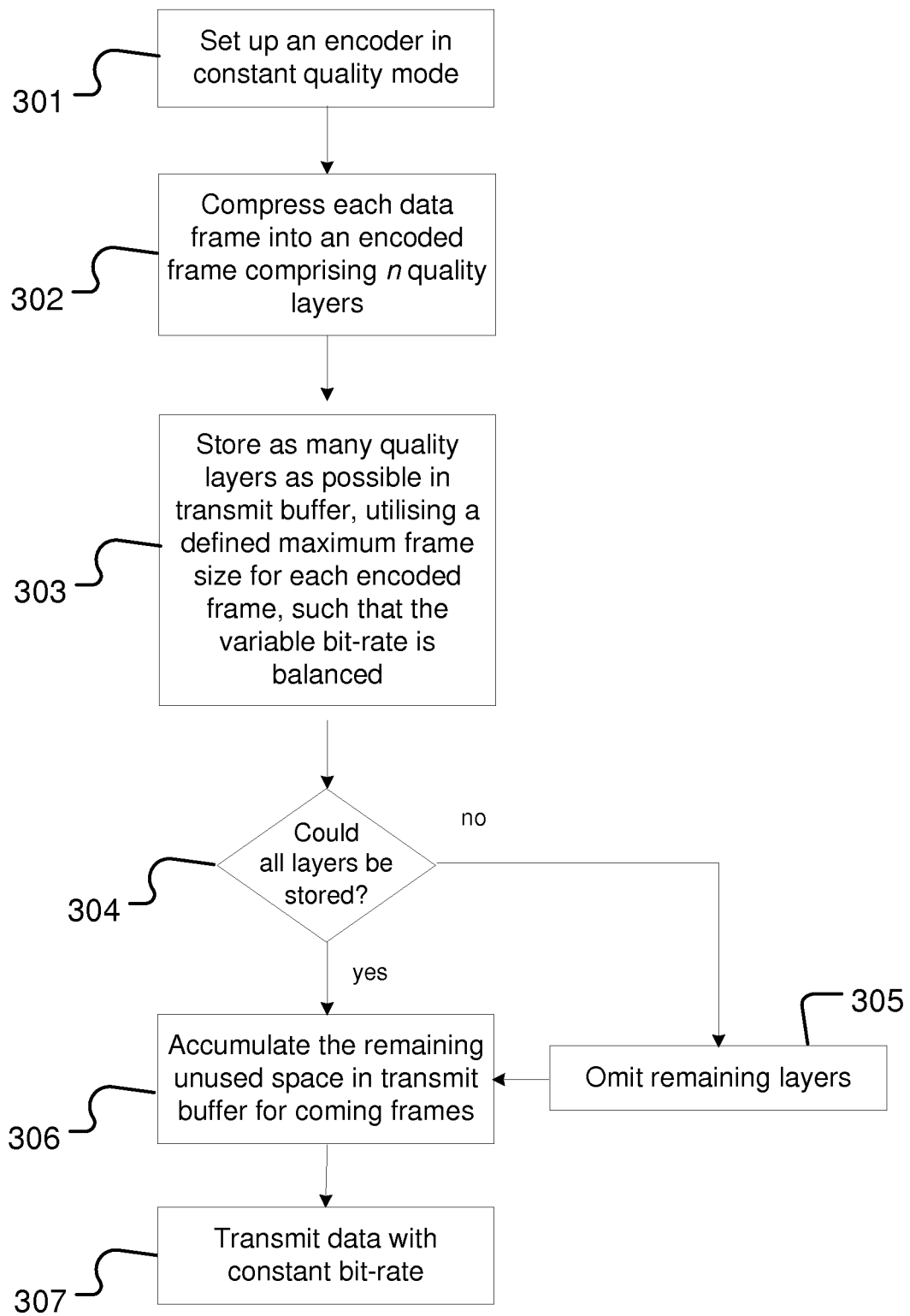
FIG. 3 is a flowchart illustrating the method for flow control.

FIG. 3 is a flowchart illustrating the method for flow control. In a real time video compression system, it is not possible to go back a recompress a frame with different target rate afterwards. Each frame passes the video compressor only once. However, when using a compression scheme based on quality layers, e.g. JPEG2000 the number of quality layers to be used may be selected after compression. The method is based on the idea to use the quality layers in e.g. JPEG2000 to achieve a mix between CQ and CB. This, in order to, in real time, ensure best possible image quality given a maximum bandwith. The idea is to set up an encoder in CQ mode with an ambitious target and then using an output buffer to balance the output flow. This implies that at some moments one will be content with a quality level below the target frame size, in order to save bits for coming frames. Hence, the output bit rate of the encoder may instantly be lower than the maximum allowed bit rate. However, this implies that at some points one will be able to utilise a quality level generating an output bit rate above the maximum bit rate, by utilising accumulated bits from previous or coming frames. The method for controlling the flow of a digital data stream that is to be transmitted with a limited transmission bit rate R will now be described in relation to FIG. 3.

The method is based on an encoder 210 being set up in a CQ mode to use n quality layers, step 301. The target quality may be ambitiously selected, i.e. the average output bit rate of the encoder 210 may be above the limited transmission bit rate R. In order to achieve some of the advantages of the invention the target quality should be selected such that the output bit rate of the encoder varies between a value below the limited transmission bit rate R and a value above limited transmission bit rate R. The output bit rate may be ambitious, i.e. it may have an expected output bit rate above R. A temporary output buffer overflow will then be solved by throwing away quality layers, as described in FIG. 6.

Each data frame 202 will then be compressed into an encoded frame 202' comprising n quality layers, step 302.

The controller 230 then stores as many quality layers 212 as possible in output buffer 220 under a defined maximum frame size, step 303.

According to the invention the defined maximum frame size i.e. maximum number of bits that may be used for each encoded frame 202, may be defined in different ways. The idea is to use a maximum frame size in order to level out the variable bit rate generated by the CQ encoder. As will be obvious from the following examples the maximum frame rate may depend on several parameters in the system and may therefore vary over time dependant e.g. on the size of the previously encoded frames or the current transmission bit rate R. Hence, the method may also comprise the step of calculating the maximum frame rate for each encoded frame that is to be stored in the output buffer.

One possibility is to let the defined maximum frame size be defined by the free space in the output buffer. Hence, all available space in the output buffer 220 may be used. This means that for the initial frames there will be a lot of space available. However, when the buffer is once filled, the space available will be the target frame size, plus possible free space accumulated from previous frame or frames. The target frame size is the target bit rate divided by the data frame rate of the digital data stream 201, i.e. the number of bits available per frame under the limited transmission bit rate R, if each frame is assigned the same number of bits. This approach implies that the delay of the output buffer 220 will vary dependant on the fullness of the buffer. This aspect of the invention will be more fully described in FIG. 8.

Another possibility is to let the defined maximum frame size be defined by the target frame size plus free space accumulated in the n previous frames 101, where n is a fixed output buffer delay. This aspect of the invention will be more fully described in FIG. 8.

Note that the principle for both variants is the same once the system has reached equilibrium, i.e. the defined maximum frame size is the target frame size plus free space accumulated from previous frame or frames, wherein the variable bit-rate is balanced. The maximum frame size may possibly also be defined in other ways, still achieving similar effects. The length of the output buffer 220 may be varied dependant on how long delay is tolerated.

In the next step 304, the controller 203 checks if all layers of the encoded frame could be stored under the maximum frame size. If the encoded frame 202' is bigger than the maximum frame size, then the overflow has to be omitted or "thrown away", step 305. This is possible, due to the encoding algorithm using quality layers. Note that only whole quality layers are omitted, which implies that all the maximum frame size may not always be utilised.

In the next step the remaining, not utilised space in the output buffer is accumulated for coming frames, step 306. In reality this just means that unused space is left for future use.

Finally, the compressed data stream provided on the output 240 can be transmitted with limited bit rate R without truncation, step 307. Depending on the implementation, the data may be delayed in the buffer, before it can be read at the output 240. Note that the transmission frame rate may vary dependant on the transmitter. The transmission frame rate does not have to be equal to the input frame rate.

Now referring back to FIG. 2, in order to execute the method for flow control described above, the controller 230 comprises means for setting up the encoder 210 in constant quality mode using quality layers, with a target quality, resulting in a variable bit rate, as described above.

The controller 230 further comprises means for, for each encoded frame storing as many of the n quality layers as possible in the output buffer 220. The defined maximum frame size for each encoded frame, i.e. the maximum number of bits that may be used, is defined as described above.

The controller 230 also comprises means for detecting if all quality layers 212 could be stored in the output buffer 220 and for accumulating the remaining free space of the output buffer for coming data frames. In other words, the controller 230 may comprise means for keeping track of the remaining free space in of the output buffer 220. The controller also comprises means for omitting the remaining layers, if all quality layers 212 could not be stored in the output buffer.

FIGS. 4, 5 and 6 illustrate how the output buffer 220 is handled when using the method for flow control described in FIG. 3.

Figure 4A:
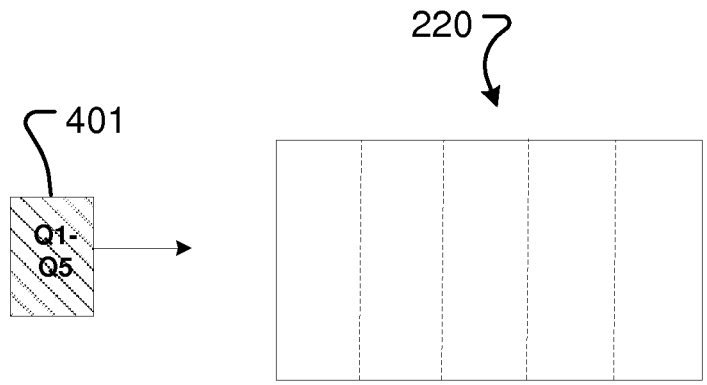
FIGS. 4, 5 and 6 illustrate how an output buffer is handled when using the method for flow control.
Figure 4B:
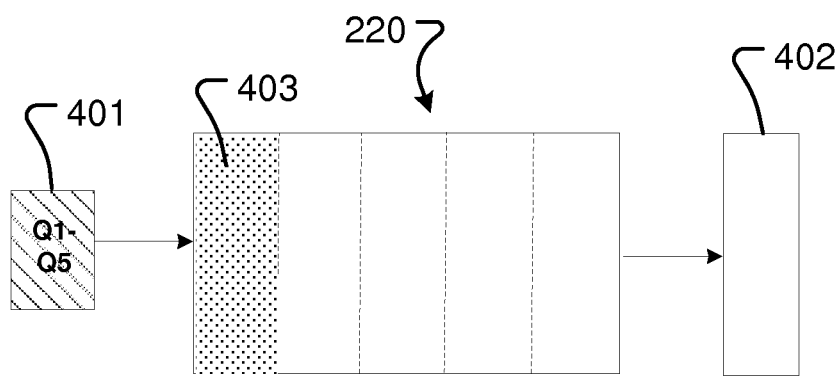

FIG. 4a shows an encoded frame 401, comprising five quality layers Q1-Q5, which is smaller than the target frame size, arriving in the output buffer 220. In this example there is, for simplicity, no space accumulated from previous received frames, when the encoded frame 401 arrives. Hence, the space available for storing the encoded frame 401 is equal to the target frame size 403, which is set free by transmission of data 402 on the output 240 during the corresponding period of time, as shown in FIG. 4b.

Figure 4C:
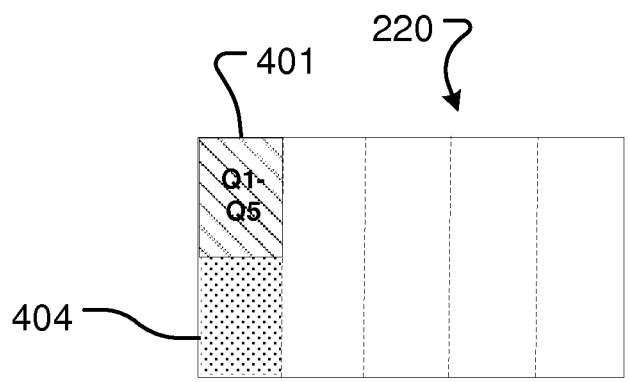

FIG. 4c shows the output buffer 220 after receiving the frame 401. Because the size i.e. the number of bits, of the received frame 401 is less than the target frame size 403, the remaining space 404 will be accumulated for coming frames. How the accumulated space is used is illustrated in FIG. 5.

Figure 5A:
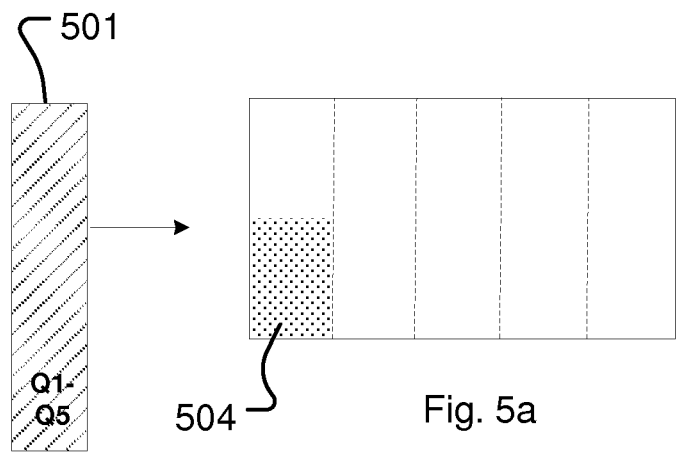
Figure 5B:
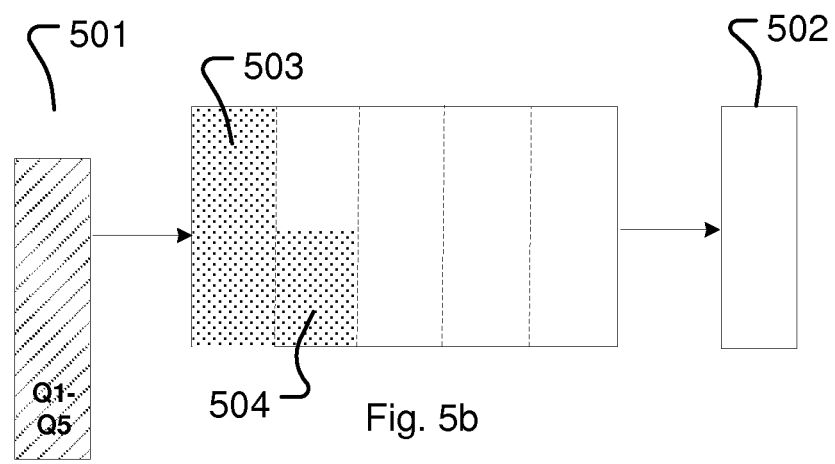

FIG. 5a shows an encoded frame 501, comprising five quality layers, which is bigger than the target frame size, arriving in the output buffer 220. In this example, there is space 504 in the output buffer 220 accumulated from previously received frames, as described in FIG. 4, when the frame 501 arrives. Hence, the space available for storing the frame 501 is the target frame size 503 plus the accumulated space 504. The target frame size 503 is the space set free by transmission of data 502 on the output 240 during the corresponding period of time, as shown in FIG. 5b.

Figure 5C:
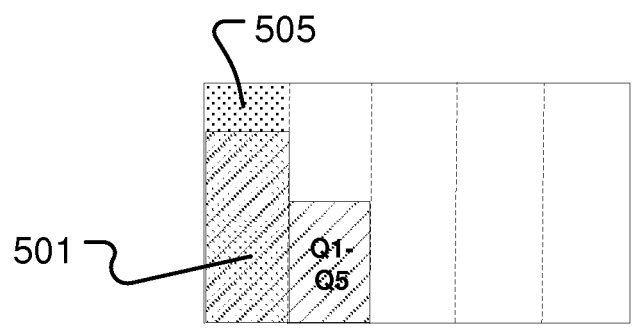

FIG. 5c shows the output buffer 220 after receiving the frame 501. Because the buffer comprised space accumulated from previous frames 504, all the data, i.e. all quality layers Q1-Q5, of the encoded frame 501 could be stored in the output buffer 220, despite the frame 501 being larger than the target frame size. Remaining space 505 is accumulated for coming frames.

Figure 6A:
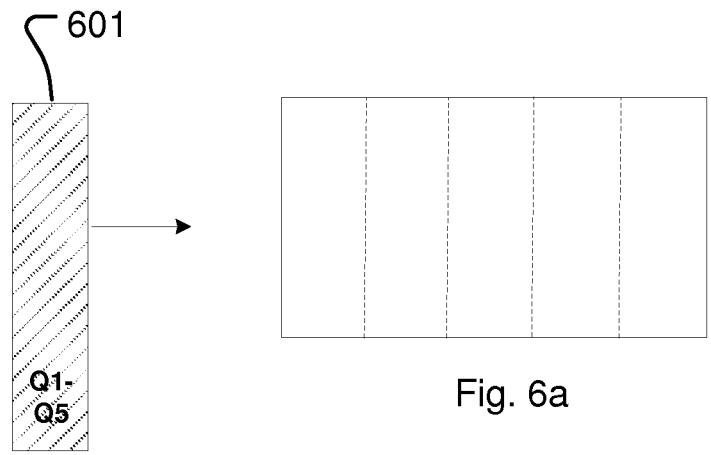
Figure 6B:
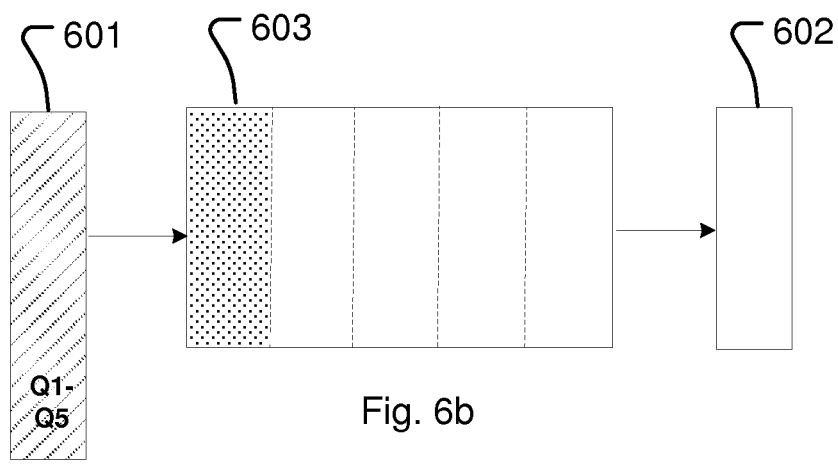

FIG. 6a shows an encoded frame 601, which is bigger than the target frame size, arriving in the output buffer 220. In this example, there is no space in the output buffer 220 accumulated from previously received frames, when the frame 601 arrives. Hence, the space available for storing the frame 601 is equal to the target frame size 603. The target frame size 603 is the space set free by transmission of data 602 on the output 240 during the corresponding period of time, as shown in FIG. 6b.

Figure 6C:
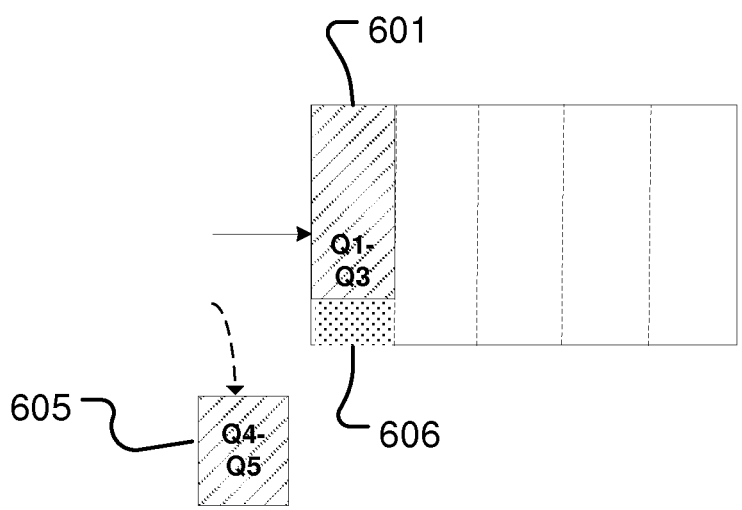

FIG. 6c shows the output buffer 220 after receiving the frame 601. Because the output buffer 220 did not comprise space accumulated from previous frame, all the data, i.e. all quality layers Q1-Q5, of the encoded frame 501 could not be stored in the output buffer 220. Hence, the upper two quality layers Q4-Q5 605 has to be omitted. When the three quality layers Q1 to Q3 has been saved in the output buffer 220, there is some remaining unused space 606 in the output buffer. The remaining unused space 606 is accumulated for coming frames.

FIG. 7 illustrates how the bit rate is balanced over time using the method for flow control.

Figure 7A:
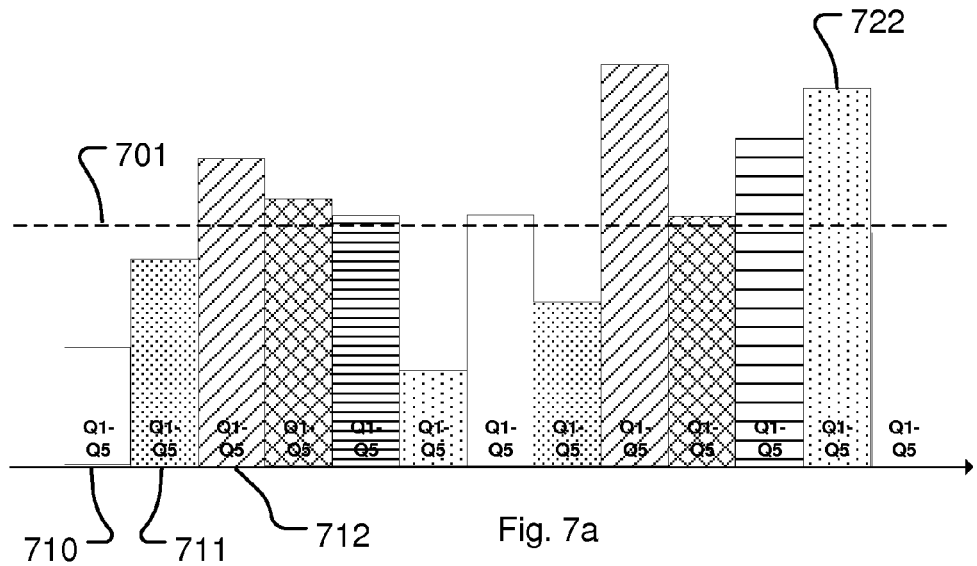
FIG. 7 illustrates how the bit rate is balanced over time using the method for flow control according to one aspect of the invention.

FIG. 7a illustrates the bit rate over time of an encoded data stream comprising CQ encoded frames, i.e. the output of the encoder 210. In FIG. 7a the horizontal axis represents time and vertical axis represents number of bits. Each pile represents one encoded frame 202'. Each encoded frame 202', comprises five quality layers Q1-Q5, each corresponding to a target quality. However, as described before, the number of bits per encoded frame varies between the frames, dependant on the complexity of the data. Hence, the resulting bit rate will also vary over time. The dashed line 701 represents a limited transmission bit rate R.

Figure 7B:
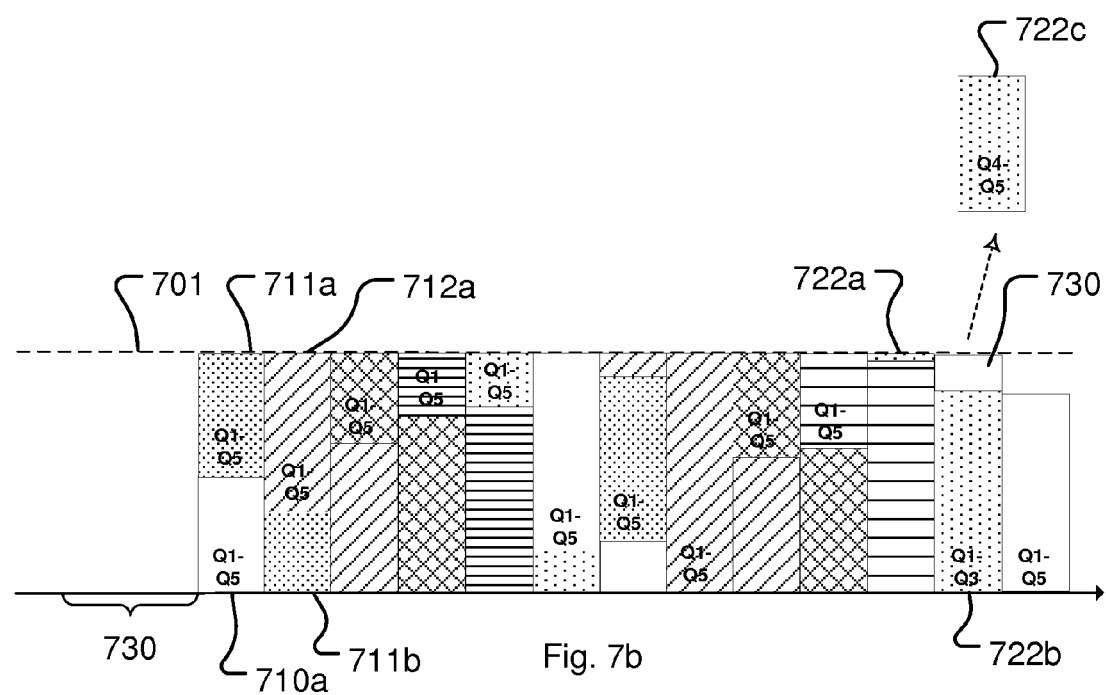

FIG. 7b illustrates the flow of bits after performing the method for flow control. The output flow shown in FIG. 7b is delayed by a time 730, corresponding to two encoded frames 202', in relation to the encoded data stream shown in FIG. 7a. Hence, in this example the length of the output buffer 220 is two. Note that this low number is selected in order to simplify the visualisation. In real life longer buffers may also be used. In FIG. 7b the horizontal axis represents time and vertical axis represents number of bits.

As can be seen in FIG. 7b, the resulting bit rate is constant and corresponds to the limited transmission bit rate R.

In this example the maximum frame size is defined as by the target frame size i.e. the number of bits available per frame under the limited transmission bit rate R when each encoded frame is assigned the same number of bits, plus free space accumulated in the n previous frames, where n is a fixed buffer delay. For simplicity, in this example, there is no space accumulated from previously received encoded frames, when the first encoded frame 710 arrives. Hence, the defined maximum frame size for the first encoded frame 710 is equal to the target frame size. In this case the first encoded frame 710 is smaller than the maximum frame size. Hence, the difference will be accumulated for use by the coming frames. Hence, when the second encoded frame 711 arrives, it will utilise accumulated space 711a and some of the current frame 711b. The remaining unused space of the current frame will be accumulated for coming frames. Hence, after receiving the second encoded frame 711, there is still unused output buffer space accumulated for coming frames.

The accumulation of space implies that the third encoded frame 712, which would otherwise exceed the target frame size, can also be transmitted without truncation, by using space 712a accumulated from the first and second encoded frames 710, 711. Hence, by this approach the limited transmission bit rate R will be fully utilised.

However, if the target frame size plus the accumulated space is not enough for storing the next encoding frame, the upper quality layers have to be sacrificed, as described in FIG. 6. This is the case for the twelfth encoded frame 722 because the twelfth encoded frame 722 is bigger than the target frame size plus accumulated space. Hence, only three quality layers Q1-Q3 could be stored utilising the maximum frame size, i.e. target frame size 722a plus accumulated space plus 722b. Layers Q4-Q5 722c are omitted or "thrown away". After sacrificing the upper layers 722c the remaining unused space 730 is accumulated for coming frames.

FIG. 8 illustrates another example of how the bit rate is balanced over time using the method for flow control.

Figure 8A:
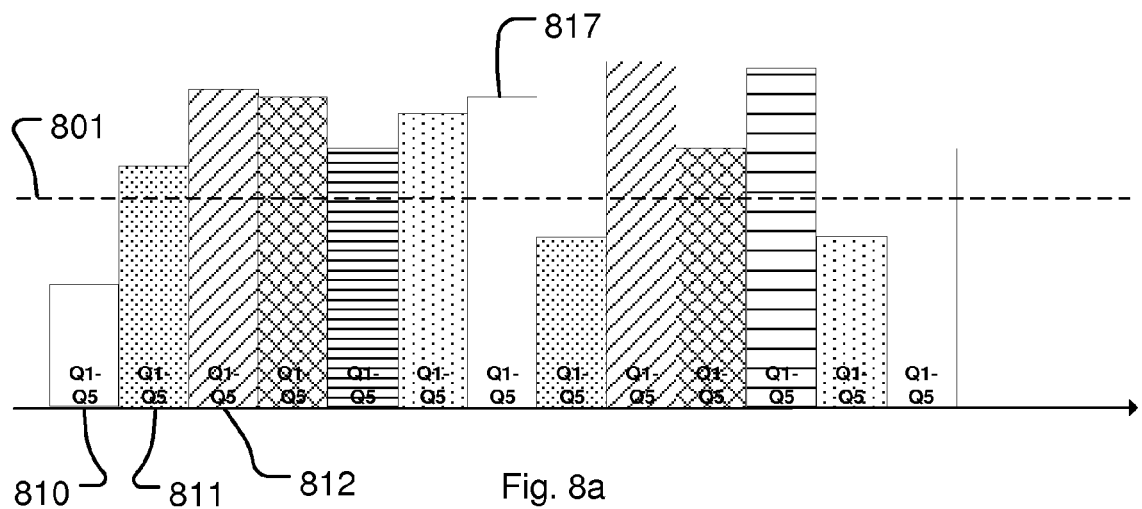
FIG. 8 illustrates how the bit rate is balanced over time using the method for flow control according to another aspect of the invention.

FIG. 8a illustrates the bit rate over time of an encoded data stream comprising CQ encoded frames, i.e. the output of the encoder 210. In FIG. 8a the horizontal axis represents time and vertical axis represents number of bits. Each pile represents one encoded frame 202'. Each encoded frame 202', comprises five quality layers Q1-Q5, each corresponding to a target quality. However, as described before, the number of bits per encoded frame varies between the frames, dependant on the complexity of the images. Hence, the resulting bit rate will also vary over time. The dashed line 801 represents a limited transmission bit rate R.

Figure 8B:
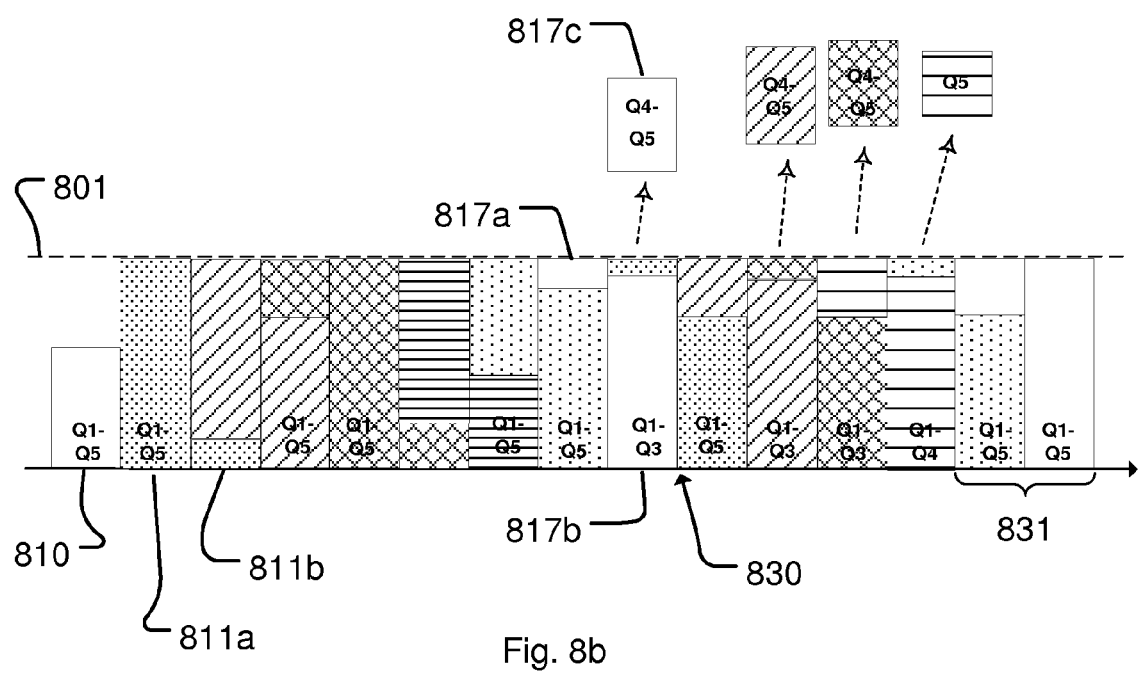

FIG. 8b illustrates the flow of bits after performing the method for flow control. In FIG. 8b the horizontal axis represents time and vertical axis represents number of bits. As can be seen in FIG. 8b, the resulting bit rate is constant and corresponds to the limited transmission bit rate R.

In this example the defined maximum frame size is defined as the free space in the output buffer. For simplicity, in this example the length of the output buffer 220 is only two target frames. Note that longer output buffers may of course as well be used.

When the first encoded frame 810 arrives, the output buffer is empty. Hence, all space in the output buffer 220 may be used, i.e. defined maximum frame size is equal to the size of the output buffer. The first encoded frame is smaller than the target frame size and may therefore be transmitted immediately without any buffer delay.

The second encoded frame 811 is slightly larger than the target frame size. Hence, the entire encoded frame 811a, 811b cannot be transmitted immediately without any delay. Instead the output buffer 220 is used, wherein the part of the encoded frame 811b exceeding the target frame rate is transmitted in the next frame. Hence, the output after performing the method of flow control is now delayed in relation to the input.

However, after receiving the second encoded frame 811, there is still buffer space available. This implies that the third encoded frame 812, which would otherwise exceed the target frame size, can also be transmitted without truncation, by using the output buffer 220. The same principle applies for all coming frames until the output buffer is full, which occurs at the point in time 830 when the output flow of the output buffer is delayed by two target frames i.e. the length of the output buffer 220, in relation to the input due to the buffering.

When the output buffer is filled, the upper quality layers have to be sacrificed, as described in FIG. 6. This is the case for the seventh encoded frame 817, which after flow control 817a, 817b only comprises three quality layers. The upper two quality layers 817c are omitted. After omitting the two upper layers of encoded frame 817c, the remaining unused bits are accumulated, as described before.

The same principle applies for coming frames. The space available for each encoded frame is equal to the free space in the output buffer, which is equal to the target frame size plus free space accumulated from previous frames. The target frame size is the area which is released by transmission on the link with limited bit rate.

The delay 831 of the output buffer depends on the fullness of the buffer. If the buffer is full, then the delay is maximal, i.e. equal to the length of the output buffer 220.

Note that as mentioned before, one the equilibrium has been reached, the principle of the method is similar independent on how the maximum frame rate is defined.

According to one aspect of the invention many data streams may share the same transmission link. When using the method described above, unused space may be shared among the different data streams. Hence, the defined maximum frame size is a target frame size defined by the transmission bit rate R, plus bits accumulated from previous frame or frames in all of the data streams sharing the same channel.

According to one aspect of the invention 1 the limited transmission bit rate R may vary over time. In such a situation it may be suitable to continuously change the target quality of the encoder 210 based on the transmission bit rate R. If the transmission link is e.g. a radio link, disturbances may cause the bit rate to fluctuate. In such a situation, it may be necessary to decrease the target quality, in order not to hit the target frame size for each frame.

The described method and apparatus can be applied multiple times in a downstream datapath. Directly after compression, and perhaps with one maximum bit rate for a communication link and with another maximum bit rate for a disc interface.

The foregoing has described the principles, preferred aspects and modes of operation of the present invention. However, the invention should be regarded as illustrative rather than restrictive, and not as being limited to the particular aspects discussed above. The different features of the various aspects of the invention can be combined in other combinations than those explicitly described. It should therefore be appreciated that variations may be made in those aspects by those skilled in the art without departing from the scope of the present invention as defined by the following claims.

The invention claimed is:

1. A method for flow control of a first digital data stream (201), that is to be sent with a limited transmission bit rate R, said method comprising the following steps:
   setting up an encoder (210) in constant quality mode, corresponding to a target quality, resulting in a variable bit rate;
   encoding, with the encoder (210), each data frame (202) of the first digital data stream (201) into an encoded frame (202') comprising n quality layers (112);
   for each encoded frame storing as many of the n quality layers (212) as possible in an output buffer (230) utilising a defined maximum frame size for each encoded frame;
   accumulating the remaining free space of the output buffer (220) for coming data frames; and
   if all quality layers (212) cannot be stored in the output buffer (220) under the defined maximum frame size, then throwing away the remaining quality layers (605).

2. The method for flow control according to claim 1, wherein the defined maximum frame size for each encoded frame, is a target frame size (403, 503, 603) defined by the transmission bit rate R, plus free space accumulated from previous frame or frames (504).

3. The method for flow control according to claim 1, wherein the defined maximum frame size for each encoded frame is the free space available in said output buffer (220).

4. The method for flow control according to claim 1, wherein the target quality results in a variable bit rate, which varies below and above the transmission bit rate R.

5. The method for flow control according to claim 1, wherein the target quality is at least one of visually or mathematically lossless.

6. The method for flow control according to claim 1, wherein the length of the output buffer (220) is 5-100 data frames (202).

7. The method for flow control according to claim 1, wherein the encoder (210) is a JPEG2000 encoder.

8. The method for flow control according to claim 1, wherein the first digital data stream (201) is a video stream.

9. The method for flow control according to according to claim 1, wherein the first digital data stream (201) is an audio stream.

10. The method for flow control according to claim 1, wherein the transmission bit rate R varies over time and wherein the method further comprises the step of continuously changing the target quality of the encoder (210) based on the transmission bit rate R.

11. The method for flow control according to claim 1, wherein the output buffer is also utilised by a second digital data stream.

12. An apparatus (200) for controlling the flow of a first digital data stream (201) that is to be transmitted with a limited transmission bit rate R, the apparatus comprising:
   an encoder (210) configured to encode each data frame (202) in the first digital data stream (201) into an encoded frame (202'), the encoded frame (202') comprising a first number of quality layers (212), representing successive quality refinements of the data frame (202);
   an output buffer (220) with a throughout defined by the limited bit rate R; and
   a controller (230) configured to:
      set up the encoder (210) in constant quality mode, corresponding to a target quality, resulting in a variable bit rate;
      for each encoded frame (202') store as many of the n quality layers as possible in the output buffer (220); utilising a defined maximum frame size (403, 503, 603) for each encoded frame;
      accumulate the remaining free space of the output buffer for coming data frames; and
      if all quality layers (212) cannot be stored in the output buffer (220), then throw away the remaining quality layers (605).

13. The apparatus (200) for flow control according to claim 12, wherein the defined maximum frame size for each encoded frame, is a target frame size (403, 503, 603) defined by the transmission bit rate R, plus free space accumulated from previous frame or frames (504).

14. The apparatus (200) for flow control according to claim 12, wherein the defined maximum frame size for each encoded frame is the free space available in said output buffer (220).

15. The apparatus (200) for flow control according to claim 12, wherein the target quality results in a variable bit rate which varies below and above the transmission bit rate R.

16. The apparatus (200) for flow control according to claim 12, wherein the target quality is at least one of visually or mathematically lossless.

17. The apparatus (200) for flow control according to claim 12, wherein the length of the output buffer is 5-100 data frames (102).

18. The apparatus (200) for flow control according to claim 12, wherein the encoder is a JPEG2000 encoder.

19. The apparatus (200) for flow control according to claim 12, wherein the first digital data stream (201) is a video stream.

20. The apparatus (200) for flow control according to claim 12, wherein the first digital data stream (201) is an audio stream.

21. The apparatus (200) for flow control according to claim 12, wherein the transmission bit rate R varies over time and wherein the buffer controller (120) is further configured to continuously adapt the target quality based on the transmission bit rate R.

22. The apparatus (200) for flow control according to claim 12, wherein the output buffer is also utilised by a second digital data stream.

23. A non-transitory computer program product comprising at least one computer-readable storage medium having computer-readable program code instructions embodied therein, the instructions being configured such that, when executed on a computer, cause the computer to execute the steps of the method according to claim 1.

* * * * *